United States Patent [19]

Larson et al.

[11] Patent Number: 5,524,235
[45] Date of Patent: Jun. 4, 1996

[54] SYSTEM FOR ARBITRATING ACCESS TO MEMORY WITH DYNAMIC PRIORITY ASSIGNMENT

[75] Inventors: John E. Larson, Katy; Michael Moriarty, Spring; Michael J. Collins; Gary W. Thome, both of Tomball, all of Tex.

[73] Assignee: Compaq Computer Corporation, Houston, Tex.

[21] Appl. No.: 324,011

[22] Filed: Oct. 14, 1994

[51] Int. Cl.$^6$ .................................................... G06F 13/18
[52] U.S. Cl. ........................... 395/478; 395/293; 395/296; 395/729; 395/732
[58] Field of Search ........................... 395/478, 296, 395/293, 728, 731, 732

[56] References Cited

U.S. PATENT DOCUMENTS

| | | | |
|---|---|---|---|
| 4,755,938 | 7/1988 | Takahashi et al. | 395/729 |
| 4,829,467 | 5/1989 | Ogata | 395/732 |
| 4,980,854 | 12/1990 | Donaldson et al. | 395/297 |
| 4,987,529 | 1/1991 | Craft et al. | 395/293 |
| 5,148,112 | 9/1992 | Gahan | 327/19 |
| 5,151,994 | 9/1992 | Wille et al. | 395/800 |
| 5,191,656 | 3/1993 | Forde, III et al. | 395/287 |
| 5,255,374 | 10/1993 | Aldereguia et al. | 395/293 |
| 5,317,696 | 5/1994 | Hilgendorf | 395/294 |
| 5,392,407 | 2/1995 | Heil et al. | 395/293 |
| 5,392,436 | 2/1995 | Jansen et al. | 395/293 |
| 5,438,666 | 8/1995 | Craft et al. | 395/842 |

FOREIGN PATENT DOCUMENTS

0374521A2  6/1990  European Pat. Off. .

OTHER PUBLICATIONS

82420/82430 PCI SET, ISA and EISA Bridges, Intel Corp., pp. 3–5, 17, 35, 37, 148, 154–157, 172–174, 211, 225–226, 293–302, 320–321, 345, 363–364, 438–444, 460–462 (1993).

*Primary Examiner*—Tod R. Swann
*Assistant Examiner*—David J. O'Neill
*Attorney, Agent, or Firm*—Pravel, Hewitt, Kimball & Krieger

[57] ABSTRACT

An arbiter circuit for controlling access to the main memory for requests asserted by the microprocessor, the refresh controller and PCI bus masters. Generally, the priority of the memory requests are as follows, with some exceptions: (1) second refresh request; (2) processor-to-memory write request; (3) memory-to-processor read request; (4) PCI-to-memory write request; (5) memory-to-PCI read request; and (6) first refresh request. The second refresh request indicates that two refreshes are outstanding. When that occurs, both outstanding refresh requests are assigned the highest priority. The processor-to-memory write request is always higher in priority than other memory requests except the second refresh. However, under certain conditions, the processor-to-memory write requests is held off to allow other cycles to proceed. The memory-to-processor read request is generally higher in priority than the PCI write and read requests, unless certain conditions occur to override that priority. PCI-to-memory write requests are always higher in priority than memory-to-PCI read requests.

24 Claims, 8 Drawing Sheets

SYSTEM FOR ARBITRATING ACCESS TO MEMORY WITH DYNAMIC PRIORITY ASSIGNMENT

SPECIFICATION

1. Field of the Invention

The present invention relates to arbitration schemes in computer systems, and more particularly, to an arbitration scheme for determining which cycles gain control of the main memory.

2. Description of the Related Art

Systems in which many devices share a common resource, such as a system bus or main memory, typically utilize arbitration schemes for allocating access to the resource under conditions during which a plurality of devices may concurrently request access. In modern computer systems, I/O devices located on expansion buses such as the Industry Standard Architecture (ISA) or the Extended Industry Standard Architecture (EISA) are able to access the main memory through a mechanism commonly known as direct memory access (DMA). DMA allows data to be transferred between I/O devices and the main memory without having to go through the microprocessor, which freed up the microprocessor to perform other functions.

The ISA bus was originally developed to improve on the bus used in the original PC architecture developed by International Business Machines Corporation (IBM)™. ISA provided for a wider data bus and allowed for faster peripheral or I/O devices. However, as computer system components grew ever more powerful, ISA proved to be inadequate, which necessitated the development of the new bus EISA standard. Both ISA and EISA support DMA transfers, although the EISA bus allows I/O devices to access a 32-bit memory space and enables higher data transfer rates between the I/O devices and main memory.

More recently, a mezzanine bus architecture standard referred to as the Peripheral Component Interconnect (PCI) was developed to allow for connection of highly integrated peripheral components on the same bus as the processor/memory system. PCI provides a bus standard on which high performance peripheral devices, such as graphics devices and hard disk drives, can be connected with the processor/memory module, thereby permitting these high performance devices to avoid the general access latency and the bandwidth constraints that would have occurred if the devices were connected to standard I/O expansion buses such as EISA or ISA. The PCI subsystem comprising the processor/memory system and the high performance peripheral devices is typically coupled to an EISA expansion bus by a PCI-EISA bridge. Consequently, in a system including a PCI bus and an EISA bus, peripheral devices on both the EISA and PCI buses are capable of requesting access to the main memory. Requests from EISA bus masters in such a system is forwarded through the PCI-EISA bridge.

Due to the existence of the many I/O and peripheral devices in the computer system that may access the main memory at any time, contention for the main memory between the microprocessor and the other system devices is very likely. In addition, due to its size, the main memory is typically implemented with dynamic random access memories (DRAMs). Each word in a DRAM needs to be refreshed periodically to prevent data loss due to charge leakage. Refresh controllers, which are typically implemented as part of the memory controller, perform the refresh function by sequentially accessing address locations in the DRAMs. As long as the rate at which each address location is refreshed is above the minimum required rate, data integrity is assured. Thus, in addition to I/O requests, the microprocessor is also competing with the refresh controller for access to the main memory.

In most computer systems, the microprocessor is the most intensive user of the main memory. Therefore, it is desirable that the microprocessor be given the highest priority. However, the arbitration scheme must also recognize that the microprocessor must relinquish control of the memory under certain conditions to prevent starvation of the mezzanine and expansion buses. Consequently, the arbitration scheme must be capable of balancing the needs of the various competing devices so that the efficiency of the computer system is optimized.

SUMMARY OF THE PRESENT INVENTION

An arbiter circuit according to the present invention controls requests to the main memory from the microprocessor, refresh controller, and PCI bus masters. In the preferred embodiment, five types of requests for the memory are possible, in the following general priority order: second refresh; microprocessor-to-memory write; memory-to-microprocessor read; PCI-to-memory write; memory-to-PCI read; and first refresh. The first refresh request asserted by the refresh controller has the lowest priority, the request being granted only if no other requests for the main memory are pending. However, once a second refresh request is asserted while the first refresh request is pending, both refresh requests are assigned the highest priority. Certain override conditions exist to change the priority ordering of the possible memory requests. In particular, the memory-to-microprocessor read request is preferably forced lower in priority than the PCI-to-memory write request in several situations. Additionally, the memory-to-microprocessor read request is preferably forced lower in priority than both the PCI read and write requests if a memory-to-PCI read request is asserted while a PCI-to-memory write request is pending. Further, several conditions exist for holding off microprocessor-to-memory write requests so that the PCI requests can be serviced in a reasonable amount of time.

BRIEF DESCRIPTION OF THE DRAWINGS

A better understanding of the present invention can be obtained when the following detailed description of the specific embodiment is considered in conjunction with the following drawings, in which.

DETAILED DESCRIPTION OF PREFERRED EMBODIMENT

The following disclosures are hereby incorporated by reference:

U.S. application Ser. No. 08/324016, entitled "Single Bank, Multiple Way Cache Memory," by Alan L. Goodrum, Jens K. Ramsey, and Michael J. Collins, filed Oct. 14, 1994;

U.S. application Ser. No. 08/324246, entitled "Memory Controller With Write Posting Queues for Processor and I/O Bus Operations and Ordering Logic for Controlling the Queues," by Michael J. Collins, Gary W. Thorne, Michael Moriarty, Jens K. Ramsey, and John E. Larson, filed Oct. 14, 1994;

U.S. application Ser. No. 08/323263, entitled "Data Error Detection and Correction System," by William J. Walker and Alan L. Goodrum, filed Oct. 14, 1994;

U.S. application Ser. No. 08/324020, entitled "Circuit for Invalidating Portions of a Cache Memory if a Write Occurs to a Write Protected Area of Main Memory" by Jens K. Ramsey, filed Oct. 14, 1994; and U.S. application Ser. No.08/323110, entitled "Circuit for Placing a Cache Memory Into Low Power Mode in Response to Special Bus Cycles," by Jens K. Ramsey, and Jeffrey C. Stevens, filed Oct. 14, 1994.

Figure 1:
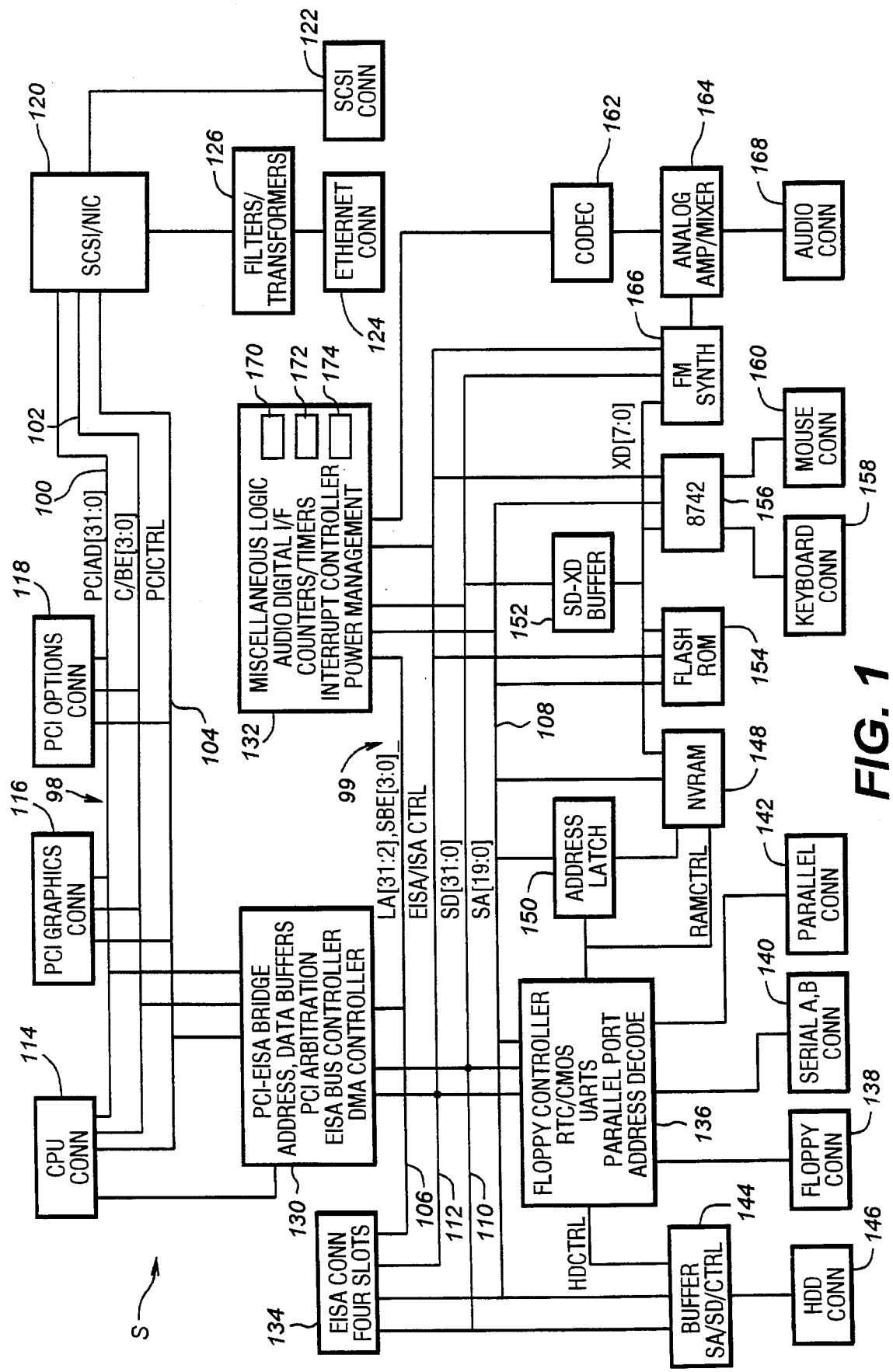
FIG. 1 is a block diagram of a system board in an exemplary computer system incorporating the preferred embodiment of the present invention.

Referring now to FIG. 1, the system board S of an exemplary computer system incorporating the preferred embodiment of the present invention is shown. In the preferred embodiment, the system board S contains circuitry and slots for receiving interchangeable circuit boards. In the preferred embodiment, there are two primary buses located on the system board S. The first bus is the PCI or Peripheral Component Interconnect bus 98 which includes address/data portion 100, also referred to as PCIAD, control and byte enable portion 102 and control signal portion 104. The address/data bus PCIAD is preferably 32 bits wide, although it can be upgraded to 64 bits if desired. The second primary bus on the system board S is the EISA bus 99. The EISA bus 99 includes LA address portion 106, SA address portion 108, SD data portion 110 and EISA/ISA control signal portion 112. The PCI and EISA buses 98 and 99 form the backbones of the system board S.

Figure 2:
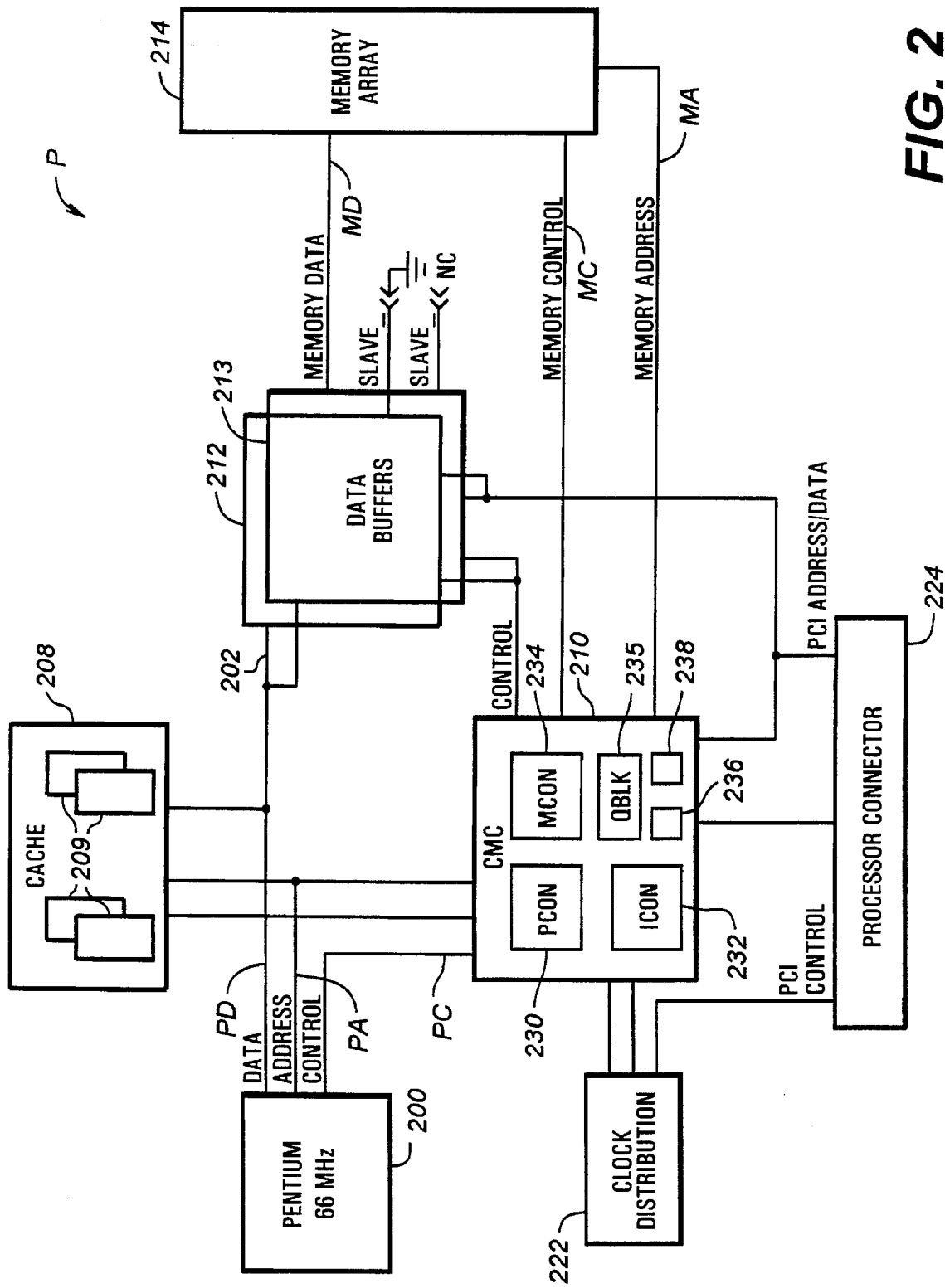
FIG. 2 is a block diagram of a processor board for connection to the system board of FIG. 1.

A CPU connector 114 is connected to the PCI bus 98 to receive a processor card, such as that shown in FIG. 2. A PCI graphics connector 116 is connected to the PCI bus 98 to receive a video graphics card (not shown). The graphics card provides video signals to an external monitor (not shown). A PCI option connector 118 is also connected to the PCI bus 98 to receive any additional cards designed according to the PCI standard. In addition, a SCSI and network interface (NIC) controller 120 is connected to the PCI bus 98. Preferably, the controller 120 is a single integrated circuit and includes the capabilities necessary to act as a PCI bus master and slave and the circuitry to act as a SCSI controller and an Ethernet™ interface. A SCSI connector 122 is connected to the controller 120 to allow connection of various SCSI devices, such as hard 30 disk drives and CD-ROM drives. An Ethernet™ connector 124 is provided on the system board S and is connected to filter and transformer circuitry 126, which in turn is connected to the controller 120. This forms a network or Ethernet connection for connecting the system board S and computer to a local area network (LAN).

A PCI-EISA bridge 130 is provided to convert signals between the PCI bus 98 and the EISA bus 99. The PCI-EISA bridge 130 includes the necessary address and data buffers and latches, arbitration and bus master control logic for the PCI bus, EISA arbitration circuitry, an EISA bus controller as conventionally used in EISA systems and a DMA controller. Preferably the PCI-EISA bridge 130 is a single integrated circuit, but other combinations are possible. A miscellaneous system logic chip 132 is connected to the EISA bus 99. In the preferred embodiment, the miscellaneous system logic chip 132 is implemented as an ASIC. The miscellaneous system logic chip 132 contains a digital audio interface, counters and timers as conventionally present in personal computer systems, an interrupt controller for both the PCI and EISA buses 98 and 99 and power management logic, as well as other miscellaneous circuitry.

A series of four EISA slots 134 are connected to the EISA bus 99 to receive ISA and EISA adapter cards. A combination I/O chip 136 is connected to the EISA bus 99. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus 99 and the combination I/O chip 136 to act as a buffer between the EISA bus 99 and a hard disk drive connector 146 to allow connection of an IDE-type hard disk drive (not shown). A non-volatile random access memory (NVRAM) 148 is connected to the EISA bus 99 and receives its control signals from the combination I/O chip 136. An address latch 150 is connected to the EISA bus 99 and controlled by the combination I/O chip 136 to provide additional addressing capability for the NVRAM 148. Preferably the NVRAM 148 is used to contain certain system information.

A data buffer 152 is connected to the SD portion of the EISA bus 99 to provide an additional data bus XD for various additional components of the computer system. The NVRAM 148 is connected to the XD data bus to receive its data bits. A flash ROM 154 receives its control and address signals from the EISA bus 99 and is connected to the XD bus for data transfer. Preferably, the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus 99 and is controlled by the miscellaneous system logic chip 132. An audio connector 168 is provided to allow external audio connections to the computer and is connected to the outputs and inputs of the analog amplifier and mixer 164.

Referring now to FIG. 2, a processor board P for use with the system board S is shown. In the processor board P, the CPU or microprocessor 200 is preferably the 64-bit Pentium™ P54 processor from Intel™ which operates at 50 or 60 MHz externally and 75 or 90 MHz internally. A 32-bit Pentium™ P24 processor can also be used for operation at 50 MHz externally and 75 MHz internally or 60 MHz externally and 90 MHz internally. The microprocessor 200 can also be a 486™ DX4 processor, also from Intel™, which operates at 33 MHz externally and 100 MHz internally. It is contemplated that other processors may be utilized. The microprocessor 200 is connected to a processor bus 202 having data, address and control portions PD, PA and PC. When used with the Pentium™ P54 processor, the width of the data bus PD is 64 bits. With the Pentium™ P24 processor or the 486™ DX4 processor, the width of the bus PD is 32 bits.

The microprocessor 200 includes an internal or L1 cache memory. A level 2 (L2) or external cache memory system 208 is connected to the processor bus 202 to provide additional caching capabilities to improve performance of the computer system. A processor cache and memory controller (CMC) and PCI bridge chip 210 is connected to the control portion PC and to the address portion PA.

The CMC 210 is subdivided into three logical portions, the portions being a processor controller (PCON) 230, a memory controller (MCON) 234, and a PCI controller (ICON) 232. The MCON 234 provides control signals MC and memory addresses MA to a main memory 214, which are preferably implemented with dynamic random access memories (DRAMs). The MCON 234 includes a refresh controller for controlling the refresh of the DRAMs in the main memory array 214. The MCON 234 also includes an arbiter for prioritizing requests for the main memory 214 asserted by the microprocessor 200, bus masters on the PCI bus 98, and the refresh controller.

The PCON 230 acts as the interface to the microprocessor 200, in addition to controlling the L2 cache memory 208. Additionally, for PCI reads and writes that are cacheable, the PCON 230 generates a snoop cycle on the processor bus 202 to determine if the snooped address is in either the L1 cache of the microprocessor 200 or the L2 cache memory 208. The ICON 232 interfaces to the PCI bus 98.

To detect if addresses provided by the microprocessor 200 or various PCI bus masters during a memory cycle are located in the L2 cache memory 208, two tag RAMs 236 and 238 are provided in the CMC 210. Preferably, the tag RAMs 236 and 238 are each organized as 2K×20. Depending on the size and associativity of the L2 cache memory 208, portions of processor address PA are used to index to an entry in the tag RAM 236 or 238. Each entry in the tag RAMs 236 or 238 contains a label and state bits to indicate the state of the corresponding line. The label in the selected entry is compared with another portion of the processor address bus PA to determine if the data is in the L2 cache memory 208. If so, the state bits are read to determine the state of the line.

The L2 cache memory 208 supports both the writethrough and writeback cache consistency protocols. If the writethrough protocol is used, all writes to the L2 cache memory 208 are written back to main memory 214 to maintain coherency between the L2 cache 208 and main memory 214. Each line in the writethrough cache is designated either as valid or invalid. The writeback cache uses the MESI (Modified/Exclusive/Shared/Invalid) protocol, as is well known in the art, although the exclusive state is not used in the L2 cache memory 208 according to the preferred embodiment. A line is considered valid if in the shared or modified states, and is invalid if in the invalid state.

The data buffers 212 and 213, which are preferably implemented with ASICs, are connected between the processor data bus PD and the 64-bit memory data bus MD provided by the memory array 214. Control signals to the data buffers 212 and 213 are provided by the CMC 210. The data buffers 212 and 213 are also connected to the PCI address and data bus PCIAD through a connector 224, which is provided to be mateably received by the processor connector 114.

The data buffers 212 and 213 each include a SLAVE_ input. As shown, the SLAVE_ input to the data buffer 212 is tied to ground and the SLAVE_ input of the data buffer 213 is not connected, the input being pulled high by an internal pull-up resistor. The data buffer 212 is referred to as the slave data buffer, and the data buffer 213 is referred to as the master data buffer. Each data buffer receives half the data bits from the processor, memory and PCI data buses PD, MD, and PCIAD, respectively.

The MCON 324 and data buffers 212 and 213 are effectively organized as a triangle or delta so that data transfer can occur between the processor bus 202 and the PCI bus 98, between the processor bus 202 and the memory 214, and between the PCI bus 98 and the memory 214. To this end three sets of queues are provided in a queue block (QBLK) 235: a P2I queue for transfer between the microprocessor 200 and the PCI bus 98, a P2M queue for transfers from the processor bus 202 to the memory 214, and an I2M queue for transfers between the PCI bus 98 and the memory 214.

It is noted that the data buffers 212 and 213 also contain queues similar to those in the MCON 234 so that addresses are tracked in the MCON 234 while the data is maintained and transferred through the data buffers 212 and 213. The MCON 234 is organized to control the data buffers 212 and 213 such that the particular control blocks 230, 232 and 234 control their respective portions of the data buffers 212 and 213. The MCON 234 handles the operation of shifting data through the queues in the data buffers 212 and 213, driving data from the queues to the actual memory devices and latching data as required from the memory devices into either the I2M queue or to registers as provided to the processor data bus PD and the PCI bus 98. It is noted that the processor-to-memory and processor-to-PCI queues are unidirectional in the data buffers 212 and 213, but the PCI-to-memory queue is operated bidirectionally, that it is used for both write data and the read ahead data.

The PCON 230 is connected directly to the ICON 232 to provide read addresses for read operations by the microprocessor 200 to the PCI bus 98. The write addresses are provided from the PCON 230 to the P2I queue. Preferably, the P2I queue is four operations deep, so that four write operations can be posted to the queue and thus be pending at one time. The output of the P2I queue is provided to the ICON 232 to provide an address stream. In similar fashion, the read address information and address bank information is provided from the PCON 230 to the MCON 234 for processor reads from the main memory 214. The write addresses and bank information are provided from the PCON 230 to the P2M queue, which is preferably four operations deep in the P54 configuration, so that four write operations from the microprocessor 200 can be posted to the memory array 214. In the 486 or P24 configuration, where the data bus PD width is 32 bits but each P2M queue entry in the data buffers 212 and 213 is 64 bits wide, the P2M queue is effectively 8 operations deep during burst writeback cycles. This is allowed only in writeback cycles as the writeback address is guaranteed to increment sequentially. Thus, memory throughput is improved during burst writeback cycles when a 32-bit processor is used. For other cycles, the P2M queue is effectively 4 operations deep. The output of the P2M queue is provided to the MCON 234.

The ICON 232 is connected to the MCON 234 to provide read addresses and memory bank information for read operations from the PCI bus 98 to the memory 214. In addition, the write address information and bank information is provided from the ICON 232 to the I2M queue. Preferably, the I2M queue is capable of posting eight addresses to provide relatively deep posting from the PCI bus 98 to the memory 214. In burst write operations from the PCI bus 98 to the memory 214, since the PCI data bus PCIAD width is 32 bits but each entry in the I2M queue in the data buffers 212 and 213 is 64 bits wide, 16 burst write addresses can be posted to the I2M queue for improved memory throughput. The output of the I2M queue is connected to the MCON 234. The MCON 234 provides a snoop request signal SNPREQ and the M2I or I2M address that is the address for memory-to-PCI read or PCI-to-memory write operations to the PCON 230. This allows the PCON 230 to perform snoop operations with the L2 cache controller and to provide the operation to the microprocessor 200 so that the L1 cache controller inside the microprocessor 200 can also perform a snoop operation. This is necessary because the L2 cache controller, and the L1 cache controller in the processor 200 in certain cases, are preferably organized as writeback cache controllers, and therefore, snoop operations must occur to maintain memory coherency. The PCON 230 provides signals P_SNPDONE and P_SNPHITM or snoop done and snoop hit to modified data to the MCON 234 to allow the MCON 234 to proceed with read or write operations or retry them as appropriate.

Clock distribution and generation circuitry 222 is associated with the processor card P and is connected to the CMC 210. The clock distribution circuitry 222 provides a clock CLK to the processor bus 202. The processor connector 224 is connected to the CMC 210 and the clock distribution circuitry 222 to provide clocks to the computer system and to provide a PCI interface to allow the microprocessor 200 to access the PCI and EISA buses 98 and 99 and to allow PCI and EISA bus masters to access the main memory array 214. The PCI address and data are multiplexed on the bus PCIAD, with the address provided during the address phase and data provided during the data phase.

In the preferred embodiment, there are five possible requests for the main memory 214: a processor-to-memory write (P2M), a memory-to-processor read (M2P), a PCI-to-memory write (I2M), a memory-to-PCI read (M2I), and refresh. A P2M write refers to a write to the memory 214 and a M2P read refers to a read of the memory 214, both initiated by the microprocessor 200. An I2M write refers to a write to the memory 214 and a M2I read refers to a read of the memory 214, both initiated by a PCI bus master. All memory requests from EISA bus masters are passed through the PCI-EISA bridge 130, which includes the necessary logic to be a bus master on the PCI bus 98. Thus, any EISA originated memory request is effectively a memory request asserted by the PCI-EISA bridge 130.

Generally, the priority of the memory requests are as follows, with some exceptions: (1) second refresh request; (2) P2M write request; (3) M2P read request; (4) I2M write request; (5) M2I read request; and (6) first refresh request. The second refresh request indicates that two refreshes are outstanding. When that occurs, the memory controller 234 gives both outstanding refresh requests the highest priority, executing both refresh cycles. The P2M write request is always higher in priority than other memory requests except the second refresh. However, under certain conditions, a signal M_P2M_NOPOST is asserted to prevent further queuing of P2M write requests. This allows the P2M queue to clear out, thereby allowing requests from the PCI bus 98 to be serviced. However, assertion of the signal M_P2M_NOPOST does not prevent writeback cycles from being queued, as the writeback may be needed by the PCI memory request.

The M2P read request is always lower in priority than the P2M write request, but it is usually higher in priority than I2M write and M2I read requests. However, an unlocked M2P read request is forced lower in priority than an I2M write request if the M2P read is to the same address as an I2M write pending in the I2M queue. When this occurs, the M2P request remains lower in priority than I2M requests until the I2M write request having the matching address is written to the main memory 214. A M2P read request is also forced lower in priority than an I2M write request if the I2M queue is full. Additionally, if an M2I read request is asserted while an I2M write request is pending, the I2M write request is forced higher in priority than the M2P read request to allow the I2M queue to clear, thereby allowing the M2I request to proceed. Further, an M2I read request is forced higher in priority than the M2P read request if the M2I read has been waiting for the M2P request to negate for more than one arbitration cycle.

The I2M write request is always lower in priority than the second refresh request, the P2M write request, and it is generally lower in priority than the M2P read request with the exceptions noted above. The I2M write request is always higher in priority than the M2I read request. The I2M write request is held off if the processor is performing a locked access of the main memory 214. Thus, for a locked processor cycle, the exceptions discussed above do not apply to override the higher priority of M2P read requests over I2M or M2I requests.

A locked or atomic access of the main memory 214 is indicated by a signal LOCK* driven by the microprocessor 200. A locked cycle allows the microprocessor 200 to read an address location in the main memory 214 and be assured that the accessed location is not changed by another bus master before the microprocessor 200 writes back to the same memory location. These type cycles are referred to as read modify write cycles. Locked cycles are also generated during other bus transfers, such as during execution of the XCHG (exchange) instruction when one of its operands is memory-based, when updating a segment or page table entry, and when executing interrupt acknowledge cycles.

The M2I read request is always lower in priority than the second refresh request, the P2M write request, and the I2M write request. However, it is higher in priority than the unlocked M2P read request in the instance noted above.

Finally, the first refresh request is always lower in priority than any of the other requests. However, as noted above, when the second refresh request is asserted, both the first and second refresh requests are executed regardless of whether other requests are pending. Having generally described the arbitration scheme above, a detailed description of the logic in the CMC 210 used to implement the arbitration scheme is described below.

Figure 3A:
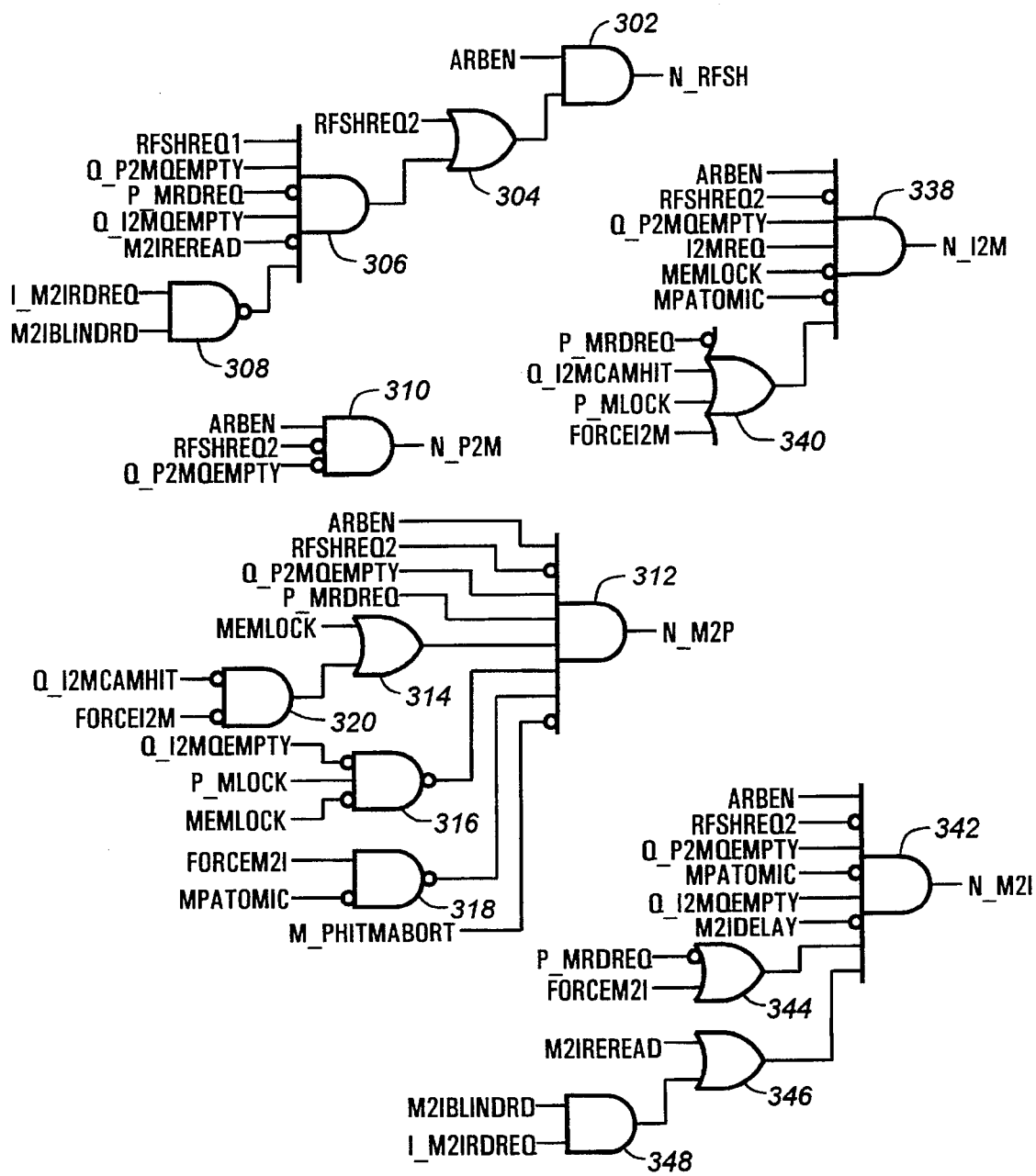
FIGS. 3A and 3B are logic diagrams of circuitry for asserting signals indicating the type of memory request granted.
Figure 3B:
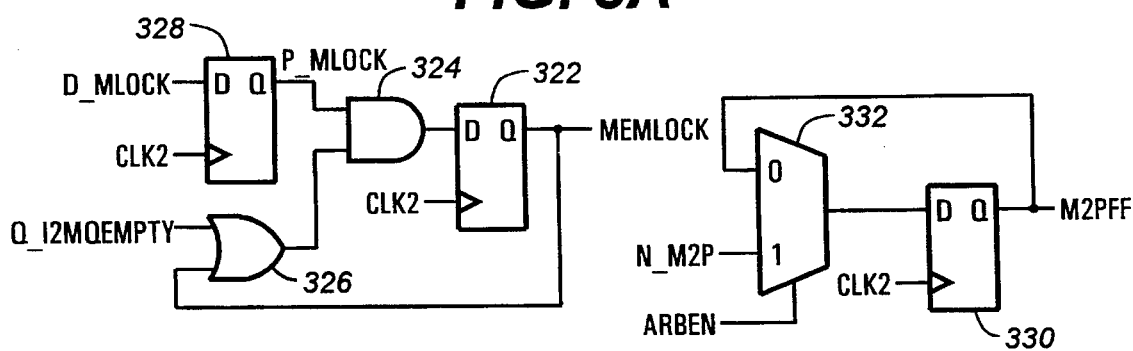

Referring now to FIGS. 3A and 3B, logic for granting access to the main memory 214 to one of the memory requests is shown. Assertion of signals N_RFSH, N_P2M, N_M2P, N_I2M, or N_M2I indicates the granting of a refresh request, a P2M write request, an M2P read request, an I2M write request, or an M2I read request, respectively, to be the next memory operation.

The signal N_RFSH is provided by an AND gate 302, whose first input receives a signal ARBEN and whose second input is connected to the output of an OR gate 304. The signal ARBEN indicates when arbitration is enabled, and is generally asserted high when a memory request is not currently being serviced. In other words, if a refresh, P2M write, M2P read, I2M write, or M2I read request has been granted access to the main memory 214, the signal ARBEN is deasserted low until some time before the memory request has completed execution. Since the MCON 234 is a pipelined memory system, the next request is observed before completion of the current memory request. Preferably, in all cycles except M2P read cycles, the signal ARBEN is re-asserted when the CAS* signals to the memory 214 are first asserted for the current memory cycle. For M2P read cycles, the signal ARBEN is re-asserted one CLK2 delay after assertion of the CAS, signals. The first input of the OR gate 304 receives a signal RFSHREQ2, and its second input is connected to the output of an AND gate 306. The signal RFSHREQ2 when asserted high indicates that a second refresh request has been generated. Thus, if the signal ARBEN is asserted high, the signal N_RFSH is asserted.

M2IREREAD, which indicates that an M2I read request has been regenerated after detection of a snoop hit to a modified line in the L1 cache of the microprocessor 200 or the L2 cache memory 208. The last input of the AND gate 306 is connected to the output of a NAND gate 308, whose inputs receive signals I_M2IRDREQ and M2IBLINDRD. The signal I_M2IRDREQ is provided by the ICON 232 for indicating if an M2I read request has been asserted, and the signal M2IBLINDRD is asserted high if the signal I_M2IRDREQ is asserted. The signal M2IBLINDRD when asserted indicates that a snoop request has been provided to the PCON 230, but that the status of the snoop cycle has not yet been determined. The signal M2IBLINDRD is described further in conjunction with FIG. 7 below. Thus, it is seen that the first refresh request has the lowest priority, as it is not recognized unless no other memory requests are pending.

Figure 5:
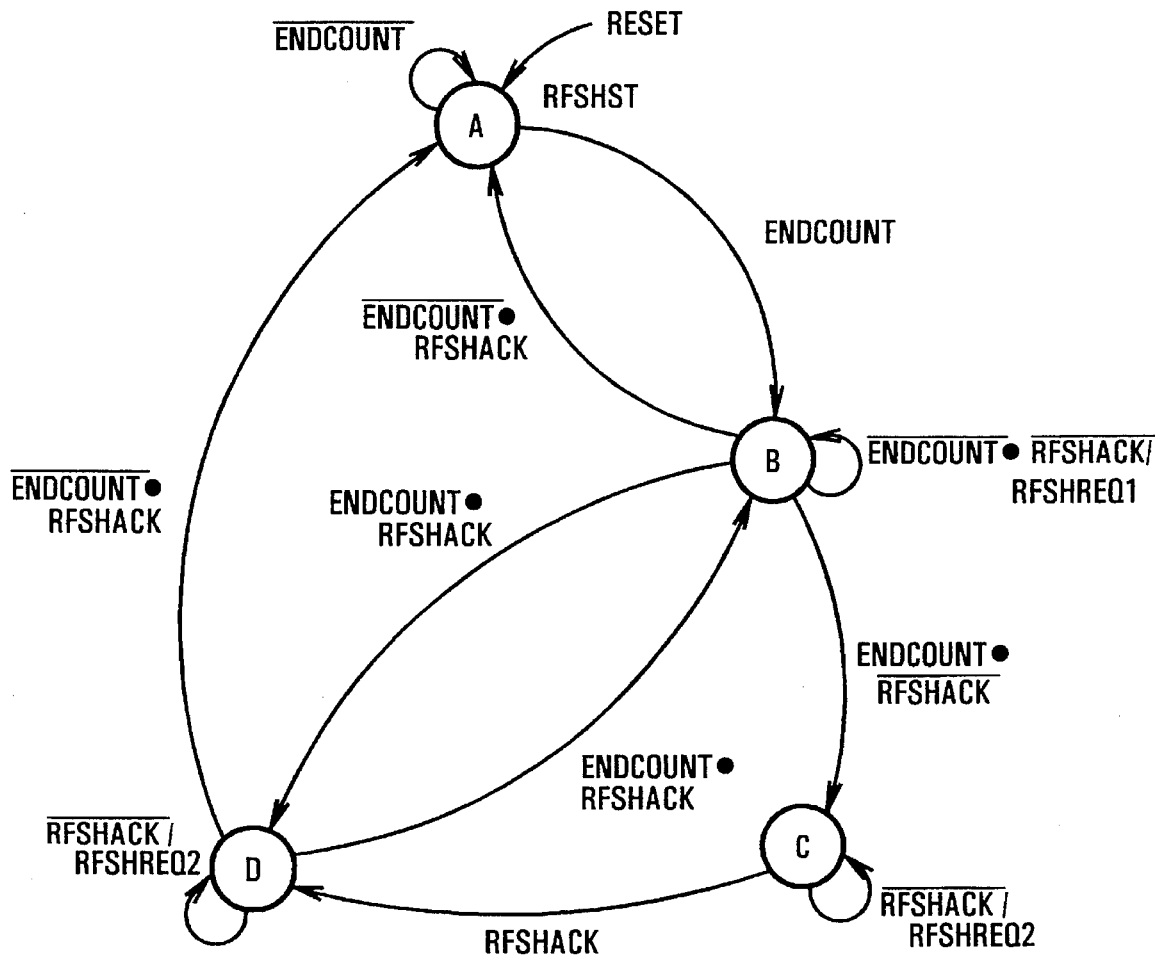
FIG. 5 is a logic diagram of circuitry for generating refresh signals.
Figure 5:
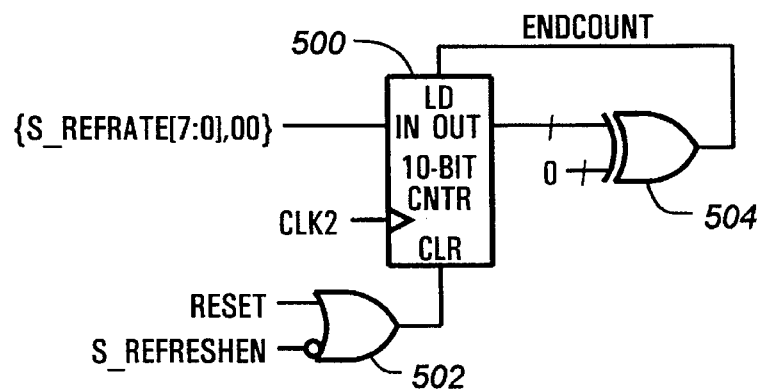

Referring now to FIG. 5, logic for generating the refresh signals RFSHREQ1 and RFSHREQ2 is shown. A decrementing 10-bit counter 500 determines when a refresh of the main memory 214 is needed. The counter 500 is initially loaded with a value {S_REFRATE[7:0], 00}. The signals S_REFRATE[7:0] are provided by a configuration register. The PCI bus defines a separate configuration space to allow the computer system to initialize and configure its components. More details on PCI configuration cycles can be obtained by review of the PCI Specification 2.0 from the PCI Special Interest Group in care of Intel Corporation, which is hereby incorporated by reference. The signals S_REFRATE [7:0], shifted to the left by two bits, defines the number of system clocks between refresh requests. The load input of the counter 500 is connected to a signal ENDCOUNT, and the counter 500 is clocked by a clock signal CLK2, which is the internal clock of the CMC 210. The clear input of the counter 500 is connected to the output of an OR gate 502, whose inputs receive a signal RESET and the inverted state of a signal S_REFRESHEN. Assertion of the signal RESET causes the computer system to reset. The signal S_REFRESHEN corresponds to bit 7 of a configuration register. When set high, the signal S_REFRESHEN indicates that refresh is enabled. The counter 500 is reset to the value 0 on the rising edge of its clear input. The output of the counter 500 is connected to one input of a comparator 504, which asserts the signal ENDCOUNT high when the counter 500 decrements to the value 0. Assertion of the signal ENDCOUNT causes the counter 500 to be reloaded.

The signal ENDCOUNT is provided to a state machine RFSHST. On system reset, the state machine RFSHST enters state A, where it remains until the signal ENDCOUNT is asserted high. When that occurs, control transitions from state A to state B. In state B, the signal RFSHREQ1 is asserted high. The state machine RFSHST remains in state B if both signals ENDCOUNT and RFSHACK are deasserted low. Assertion of the signal RFSHACK indicates that the current refresh request has been granted and is being serviced. Thus, if the signal RFSHACK is asserted high, and the signal ENDCOUNT is deasserted low, control returns to state A. However, if the counter 500 indicates that another refresh cycle is needed by asserting the signal ENDCOUNT, and the signal RFSHACK remains deasserted low, the state machine RFSHST transitions from state B to state C. In state C, the signal RFSHREQ2 is asserted high to indicate that two refresh requests are outstanding. Control remains in state C until the signal RFSHACK is asserted high, in which case the state machine RFSHST transitions from state C to state D. This indicates that one of the pending refresh requests has been serviced. In state D, the signal RFSHREQ2 is maintained high to ensure that the remaining refresh request maintains the highest priority.

The state machine RFSHST transitions from state B to state D if both signals ENDCOUNT and RFSHACK are asserted high, indicating that the counter 500 has decremented to 0 at the same time that the first refresh request is granted access to the main memory 214. The state machine RFSHST remains in state D while the signal RFSHACK is deasserted low. If the signal RFSHACK is asserted high, and the signal ENDCOUNT is asserted high to indicate that a new refresh request is needed, control transitions from state D to state B, where the low priority refresh request signal RFSHREQ1 is asserted high. However, if the signal RFSHACK is asserted high and the signal ENDCOUNT remains deasserted low, the state machine RFSHST transitions from state D back to the idle state A.

Returning now to FIGS. 3A and 3B, the signal N_P2M is provided by an AND gate 310. The inputs of the AND gate 310 receive the arbitration enable signal ARBEN, the inverted state of the signal RFSHREQ2, and the inverted state of the signal Q_P2MQEMPTY. This guarantees that any P2M write request pending in the P2M queue has the highest priority if the signal RFSHREQ2 is deasserted.

The signal N_M2P is provided by an AND gate 312, which receives the signal ARBEN, the inverted state of the signal RFSHREQ2, the signal Q_P2MQEMTY, the signal P_MRDREQ, and the inverted state of a signal M_PHITMABORT. The other inputs of the AND gate 312 are connected to the output of an OR gate 314, the output of a NAND gate 316 and the output of a NAND gate 318. The signals RFSHREQ2 and Q_P2MQEMTY are provided to the AND gate 312 to ensure that the M2P read request remains lower in priority than the second refresh request and the P2M write request. The signal P_MRDREQ indicates a processor-to-memory read request is pending.

The first input of the OR gate 314 receives a signal MEMLOCK and the second input is connected to the output of a NOR gate 320. The NOR gate 320 receives signals Q_I2MCAMHIT and FORCEI2M. The signal MEMLOCK is provided by a D flip flop 322, which is clocked by the signal CLK2. The D input of the D flip flop is connected to the output of an AND gate 324, whose first input is connected to the output of an OR gate 326 and whose second input receives a signal P_MLOCK. The OR gate 326 receives the signal MEMLOCK and a signal Q_I2MQEMPTY, which is asserted high when the I2M queue is empty. The signal P_MLOCK is provided by a D flip flop 328, which is clocked by the signal CLK2. The D input of the D flip flop 328 receives a signal D_MLOCK, which is asserted high if a locked cycle is generated by the microprocessor 200 on the processor bus 202, as indicated by the signal LOCK* being asserted low, and a locked cycle is not currently pending in the I2M queue. A PCI locked request is indicated by the PCI signal LOCK* being asserted low. Thus, if a CPU locked cycle is asserted, a PCI locked cycle is not currently pending, and the I2M queue is currently empty, the signal MEMLOCK is latched high by the D flip flop 322 to indicate that a processor initiated locked access of the main memory 214 is currently pending.

The signal Q_I2MCAMHIT, when asserted high, indicates that the processor address PA provided with the M2P read request matches the address of an I2M write request in the I2M queue. If this occurs, the M2P read request is forced lower in priority than I2M write requests until the I2M write request having the matching address has been serviced, at which time the signal Q_I2MCAMHIT is deasserted low.

Figure 4:
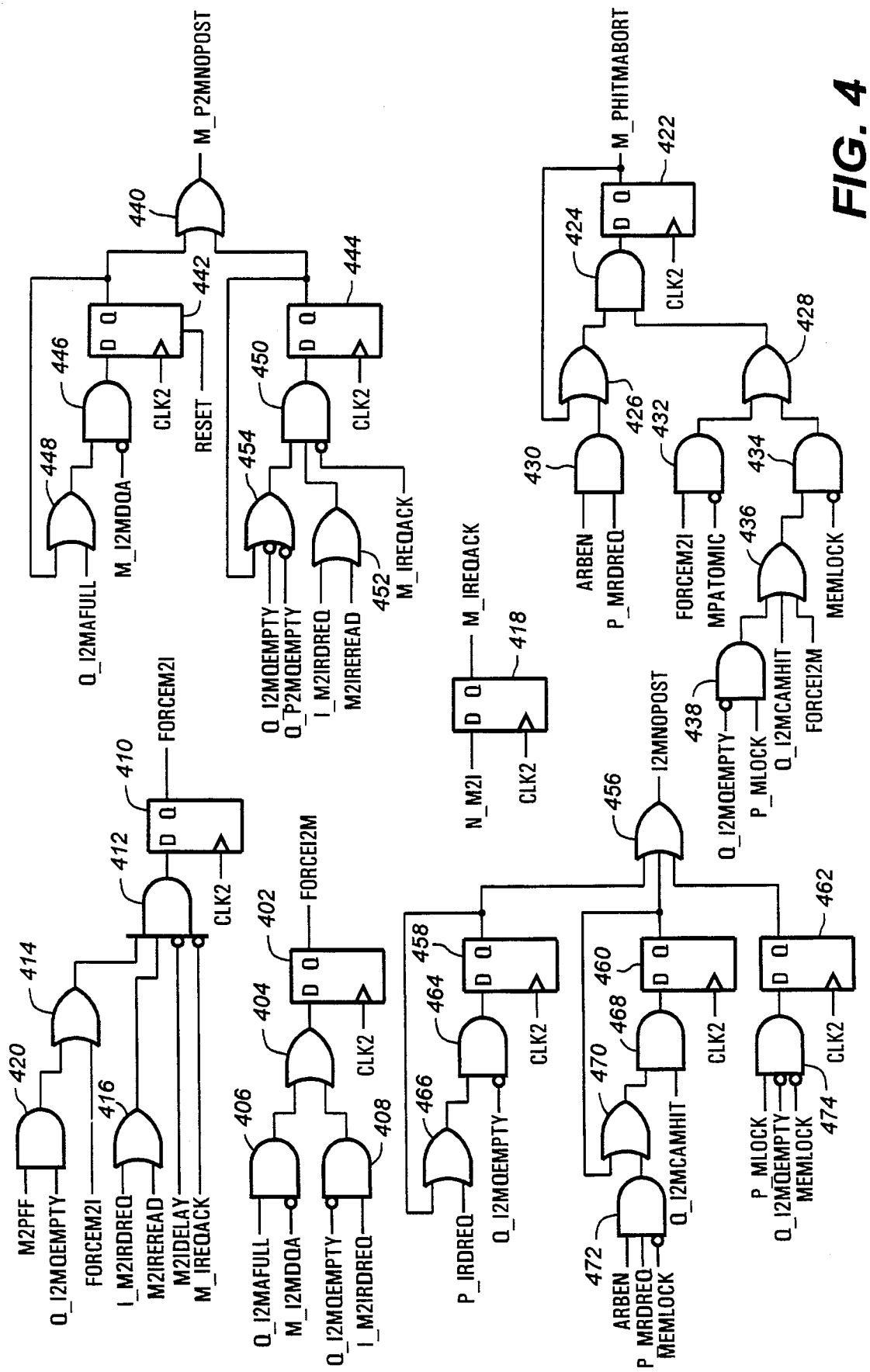
FIG. 4 is a logic diagram of circuitry for asserting signals indicating various override conditions in the arbitration scheme.

The signal FORCEI2M is provided by a D flip flop 402 in FIG. 4, to which reference is now made. The signal FORCEI2M is asserted high to force an I2M write request higher in priority than the M2P read request. The D input of the D flip flop 402 is connected to the output of an OR gate 404, whose inputs are connected to the outputs of AND gates 406 and 408. The inputs of the AND gate 406 receive a signal Q_I2MAFULL and the inverted state of a signal M_I2MDQA. The signal Q_I2MAFULL indicates that the I2M queue is full. The signal M_I2MDQA indicates that an I2M write has initiated and a pointer pointing to the I2M queue has been incremented to the next position in the I2M queue. When the signal M_I2MDQA is asserted, that indicates the I2M queue cannot be full. The AND gate 408 receives a signal I_M2IRDREQ, provided by the ICON 232 to indicate if an M2I read request is asserted, and the inverted state of the signal Q_I2MQEMPTY. Thus, if the I2M queue is full and an I2M request is not currently being serviced, or if an M2I read request is generated while the I2M queue is not empty, the signal FORCEI2M is asserted high to keep the signal N_M2P in the deasserted state.

Referring back to FIG. 3A, the NAND gate 316 receives the signal P_MLOCK, the inverted state of the signal Q_I2MQEMPTY, and the inverted state of the signal MEMLOCK. The NAND gate 316 ensures that if a processor initiated locked cycle is not currently pending, that is, the signal MEMLOCK is deasserted low, any locked request by the microprocessor 200 is not recognized until the I2M queue is cleared. Since a locked M2P read request cannot be pushed down in priority by pending I2M or M2I requests, the processor initiated locked cycle is held off to ensure that pending PCI requests are first serviced.

The inputs of the NAND gate 318 receives a signal FORCEM2I and the inverted state of a signal MPATOMIC. The signal MPATOMIC is asserted high in what are referred to as "pseudo locked" cycles. Such cycles include writeback cycles and read and write allocate cycles with replacement writebacks. A read allocate cycle is executed when a read of the L2 cache memory 208 results in a miss. The missed line is read from the main memory 214 and allocated into the L2 cache memory 208. Similarly, a write allocate cycle occurs when a write to the L2 cache memory 208 results in a miss. If an allocated line in the L2 cache memory 208 is in the modified state, then a replacement writeback cycle is executed to write back the modified line to the main memory 214 before replacing the L2 cache lines. Thus, if the signal MPATOMIC is asserted, the arbiter does not arbitrate for PCI cycles. Otherwise, if the signal MPATOMIC is deasserted, assertion of the signal FORCEM2I causes the M2I read request to be prioritized higher than the M2P read request.

Referring again to FIG. 4, the signal FORCEM2I is provided by a D flip flop 410, which is clocked by the signal CLK2. The D input of the D flip flop 410 is connected to the output of an AND gate 412, whose inputs are connected to the output of an OR gate 414 and the output of an OR gate 416. The inputs of the AND gate 412 also receive the inverted state of a signal M2IDELAY and the inverted state of a signal M_IREQACK. Asserting the signal M2IDELAY holds off the M2I read request, and the signal M_IREQACK is asserted high to acknowledge that an M2I read request has been granted. The signal M_IREQACK is provided by a D flip flop 418, which is clocked by the signal CLK2. The D input of the D flip flop 418 receives the signal N_M2I.

The inputs of the OR gate 416 receive signals I_M2IRDREQ, which indicates an M2I read request, and a signal M2IREREAD, which is asserted to regenerate an M2I read request after completion of a writeback cycle from either the L1 cache or the L2 cache memory 208 which is generated in response to an M2I snoop request. The first input of the OR gate 414 receives the signal FORCEM2I and the second input is connected to the output of an AND gate 420. The inputs of the AND gate 420 receives signals M2PFF and Q_I2MQEMPTY. The signal M2PFF is provided by a D flip flop 330 in FIG. 3B, which is clocked by the signal CLK2. The D input of the D flip flop 330 is connected to the output of a multiplexer 332. The 0 input of the multiplexer 332 is connected to the signal M2PFF and the 1 input is connected to the signal N_M2P. The multiplexer 332 is selected by the arbitration enable signal ARBEN. If an M2P read request wins during an arbitration cycle, the signal M2PFF is latched high by the D flip flop 330 when the signal ARBEN is deasserted low. Thus, when an M2P read request was granted in the previous arbitration cycle, the I2M queue is not empty, and an M2I read request is asserted, the signal FORCEM2I is asserted high to force the granting of all the pending I2M write requests and the M2I read request before another M2P read request can be granted. Once the pending M2I read request is granted, the signal M_IREQACK is asserted high to drive the signal FORCEM2I back low.

Referring again to FIG. 4, the signal M_PHITMABORT, which also disables the granting of an M2P read request, is provided by a D flip flop 422. The D flip flop 422 is clocked by the signal CLK2 and its D input is connected to the output of an AND gate 424. The inputs of the AND gate 424 are connected to the output of an OR gate 426 and the output of an OR gate 428. The first input of the OR gate 426 is connected to the signal M_PHITMABORT, and its second input is connected to the output of an AND gate 430. The inputs of the AND gate 430 receive the signals ARBEN and P_MRDREQ. The inputs of the OR gate 428 are connected to the output of an AND gate 432 and the output of an AND gate 434. The inputs of the AND gate 432 receive signals FORCEM2I and the inverted state of the signal MPATOMIC. The first input of the AND gate 434 is connected to the output of an OR gate 436, and its second input receives the inverted state of the signal MEMLOCK. Two inputs of the OR gate 436 receive signals Q_I2MCAMHIT and FORCEI2M, and the last input is connected to the output of an AND gate 438. The inputs of the AND gate 438 receive the signal P_MLOCK and the inverted state of the signal Q_I2MQEMPTY. Thus, if the signal M_PHITMABORT is already asserted high, or if an M2P read request is asserted, one of the following conditions causes the signal M_PHITMABORT to be asserted or maintained at a high state, thereby disabling the granting of an M2P read request: the signal FORCEM2I is asserted high and a "pseudo locked" processor cycle is not pending; a locked M2P request is not currently pending and the signal FORCEI2M is asserted high, the signal Q_I2MCAMHIT is asserted high, or a processor locked cycle is generated, but the I2M queue is not empty. It is noted that the above conditions are already provided as inputs to the AND gate 312 to disable the signal N_M2P. The purpose of the signal M_PHIT-MABORT is to extend the disabling of the signal N_M2P by one CLK2 cycle. The signal M_PHITMABORT is also provided to the PCON 230. When the signal M_PHIT-MABORT is asserted high, the PCON 230 responds by asserting the processor back off signal BOFF* low. Assertion of the signal BOFF, causes the microprocessor 200 to abort all outstanding bus cycles, which in this case is the M2P read cycle. On the next bus clock, the microprocessor 200 floats most of its output pins. When the signal BOFF* is negated high by the CMC 210, the microprocessor 200 restarts the aborted M2P read cycle. Thus, any override of the M2P read request is accompanied by a back off request BOFF* to the microprocessor 200.

Referring back to FIG. 3A, the signal N_I2M is provided by an AND gate 338. The AND gate 338 receives the arbitration enable signal ARBEN, the inverted state of the signal RFSHREQ2, the signal Q_P2MQEMPTY, a signal I2MREQ, the inverted state of the signal MEMLOCK, and the inverted state of the signal MPATOMIC. The last input of the AND gate 338 is connected to the output of an OR gate 340, whose inputs receive the signals FORCEI2M, P_MLOCK, Q_I2MCAMHIT, and the inverted state of the signal P_MRDREQ,. Thus, the signal N_I2M is asserted high if an I2M write request is asserted as indicated by the signal I2MREQ, a second refresh cycle is not pending, the P2M queue is empty, a locked or pseudo locked M2P read request is not pending, and one of the following conditions is true: the signal FORCEI2M is asserted high, the signal P_MLOCK is asserted high to indicate that a locked cycle has been generated on the processor bus 202, the signal Q_I2MCAMHIT is asserted high to indicate that an M2P read request has hit an I2M write request in the I2M queue, or the signal P_MRDREQ is deasserted low to indicate no pending M2P read request.

The signal N_M2I is provided by an AND gate 342. The inputs of the AND gate 342 receive the signal ARBEN, the inverted state of the signal RFSHREQ2, the signal Q_P2MQEMPTY, the inverted state of the signal MPATOMIC, the signal Q_I2MQEMPTY, and the inverted state of the signal M2IDELAY. The inputs of the AND gate 342 are also connected to the output of an OR gate 344 and the output of an OR gate 346. The inputs of the OR gate 344 receive the signal FORCEM2I and the inverted state of the signal P_MRDREQ. The first input of the OR gate 346 receives the signal M2IREREAD and the second input is connected to the output of an AND gate 348. The inputs of the AND gate 348 receive signals M2IBLINDRD and I_M2IRDREQ. The M2I read request is not granted while a second refresh request is pending, the P2M queue is not empty, the I2M queue is not empty, an M2P pseudo locked request is pending, or the M2I read request is held off by the signal M2IDELAY. However, if the above conditions are not true, then the signal N_M2I is asserted high if the following is true: an M2I read request is asserted as indicated by the signal M2IREREAD asserted high or the signals I_M2IRDREQ and M2IBLINDRD both asserted high; and the signal FORCEM2I is asserted high or the signal P_MRDREQ is deasserted low to indicate that an M2P read request is not pending.

To prevent P2M write requests, which have the highest priority other than the second refresh request, from potentially starving the PCI bus 98, certain conditions will stop further postings of P2M writes to the P2M queue. To this end, a signal M_P2MNOPOST is provided by the MCON 234 to the PCON 230. Assertion of the signal M_P2MNOPOST prevents further P2M write requests from entering the P2M queue. This allows the P2M queue to clear, thereby allowing PCI write and read requests to proceed. As noted earlier, the signal M_P2MNOPOST does not prevent writeback requests from being posted in the P2M queue, as those cycles may be needed by an M2I read request. Referring again to FIG. 4, the signal M_P2MNOPOST is provided by an OR gate 440, whose inputs are connected to the outputs of D flip flops 442 and 444. Both D flip flops 442 and 444 are clocked by the signal CLK2, and the D flip flop 442 is reset low by the signal RESET. The D input of the D flip flop 442 is connected to the output of an AND gate 446, whose first input receives the inverted state of the signal M_I2MDQA and whose second input is connected to the output of an OR gate 448. The first input of the OR gate 448 receives the signal Q_I2MAFULL, which is asserted high when the I2M queue is full. The second input of the OR gate 448 is connected back to the output of the D flip flop 442. Thus, further P2M write requests are blocked if the I2M queue is full. However, if the I2M write request is currently being serviced, as indicated by the signal M_I2MDQA being asserted high, the signal M_P2MNOPOST is kept low. The signal M_I2MDQA also serves to reset the D flip flop 442 when an I2M write request has been serviced in response to the I2M queue being full.

The input of the D flip flop 444 is connected to the output of an AND gate 450, whose first input receives the inverted state of the signal M_IREQACK, and whose other inputs are connected to the outputs of OR gates 452 and 454. The inputs of the OR gate 452 receive signals I_M2IRDREQ and M2IREREAD. The first input of the OR gate 454 is connected to the output of the D flip flop 444, and the second and third inputs of the OR gate 454 receive the inverted state of the signal Q_I2MQEMPTY and the inverted state of the signal Q_P2MQEMPTY. Thus, when an M2I read is asserted, the P2M queue and the I2M queue are cleared as soon as possible by asserting M_P2MNOPOST to allow the M2I read to be serviced in a reasonable amount of time. Once the M2I read request is granted, the signal M_IREQACK is asserted high to clear the D flip flop 444.

Certain conditions also exist to prevent the queuing of I2M write requests in the I2M queue. I2M writes are held off if a signal I2MNOPOST is asserted high. The signal I2MNOPOST is provided by a 3-input OR gate 456, whose inputs are connected to the outputs of D flip flops 458, 460 and 462. All three D flip flops 458, 460 and 462 are clocked by the signal CLK2. The D input of the D flip flop 458 is connected to the output of an AND gate 464, whose first input receives the inverted state of the signal Q_I2MQEMPTY, and whose second input is connected to the output of an OR gate 466. The first input of the OR gate 466 receives a signal P_IRDREQ, which is provided by the PCON 230 to the ICON 232 to indicate an I/O read request from the microprocessor 200 to the PCI bus 98. The second input of the OR gate 466 is connected to the output of the D flip flop 458. Thus, if a processor-to-PCI read request is pending in the P2I queue, and an I2M write request is pending, then further posting of I2M write requests to the I2M queue is prohibited. This allows an I/O read request from the microprocessor 200 to be completed in a reasonable amount of time.

The D input of the D flip flop 460 is connected to the output of an AND gate 468, whose first input receives the signal Q_I2MCAMHIT, and whose second input is connected to the output of an OR gate 470. The first input of the OR gate 470 is connected to the output of an AND gate 472, and a second input of the OR gate 470 is connected to the output of the D flip flop 460. The inputs of the AND gate 472 receive the signal ARBEN, the signal P_MRDREQ, and the inverted state of the signal MEMLOCK. Thus, if an unlocked memory-to-processor read request, indicated by the signal MEMLOCK being deasserted, results in a hit to an entry in the I2M queue, as indicated by the assertion of the signal Q_I2MCAMHIT, further posting of I2M write requests is prevented. It is noted that a locked M2P read cycle accepted by the MCON 234 will never interfere with I2M write requests, as the I2M queue must be emptied before the signal MEMLOCK is allowed to be asserted. Thus, if the address of an M2P read request is in the I2M queue, and the signal MEMLOCK is not asserted, I2M write requests are forced higher in priority than M2P read requests. This allows the I2M write request containing the matching address to be written to the main memory 214 first before the M2P read request is allowed to proceed. However, before the matching I2M write can be serviced, all the I2M write requests higher up in the I2M queue must first be serviced. Preventing further posting of I2M write requests ensures that the M2P read request can be serviced as soon as possible after the I2M write request containing the matching address has been serviced. Although M2P read requests are generally higher in priority than I2M write requests, it must be remembered that if I2M writes are allowed to be posted to the I2M queue, and an M2I read is subsequently asserted, then the signal FORCEI2M is asserted high to override the M2P request.

The D input of the D flip flop 462 is connected to the output of an AND gate 474, whose inputs receive the signal P_MLOCK, the inverted state of the signal Q_I2MQEMPTY, and the inverted state of the signal MEMLOCK. As discussed above, processor locked cycles are not granted by the CMC 210 until the I2M queue has cleared. Thus, to prevent I2M write requests from indefinitely postponing processor locked requests, the signal I2MNOPOST is asserted high to allow the I2M queue to empty.

Figure 6:
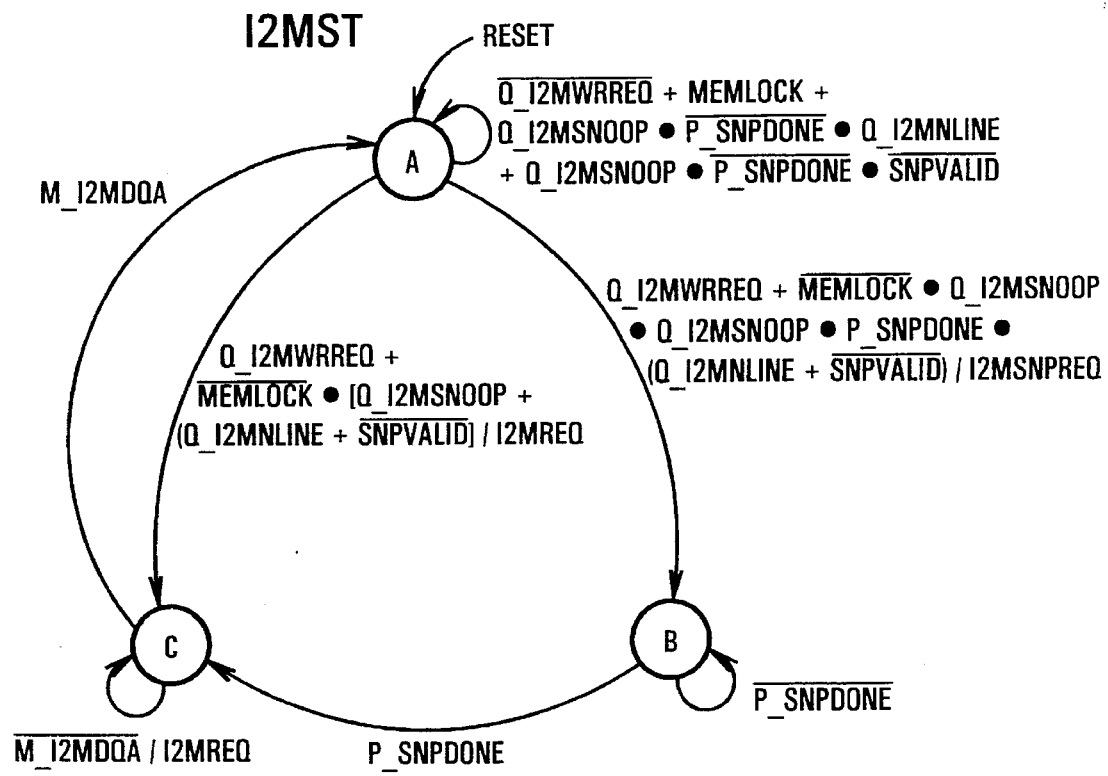
FIG. 6 is a logic diagram of circuitry for handling write requests to the memory initiated by a PCI bus master.
Figure 6:
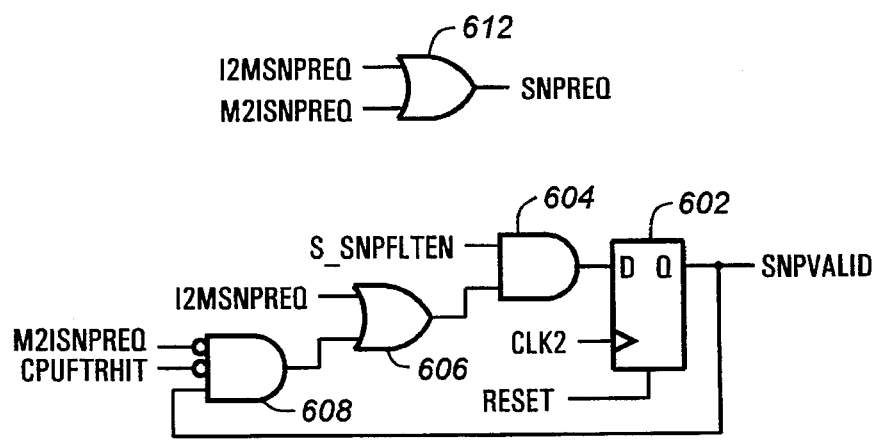
Figure 6:
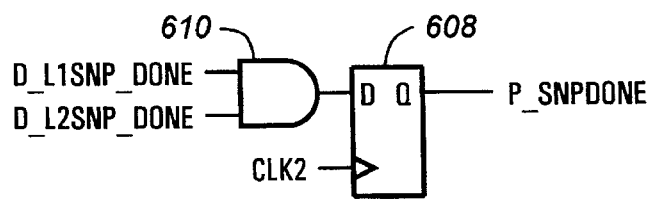

Referring now to FIG. 6, a state machine I2MST and related logic for controlling I2M write requests are shown. On system reset, the state machine I2MST enters state A, where it remains until one of the following two expressions is true. The first expression is:

Q_I2MWRREQ•!MEMLOCK•Q_I2MSNOOP•P_
SNPDONE•(Q_I2MNLINE+!SNPVALID)

The second expression is:

Q_I2MWRREQ•!MEMLOCK•(!Q_I2MSNOOP+!Q_I2MNLINE
•SNPVALID)

Assertion of the signal Q_I2MWRREQ indicates that an I2M write request is currently in the I2M queue. The signal MEMLOCK, when asserted high, indicates that the main memory 214 is locked by a processor cycle. The signal Q_I2MSNOOP is asserted high if the address provided with the current I2M write request is a cacheable address, either the L1 cache and the microprocessor 200 or the L2 cache memory 208 is enabled, and either the L1 cache or the L2 cache is configured in the writeback mode. The signal Q_I2MSNOOP is actually a queued version of a signal S_SNOOP, stored in the I2M queue along with the I2M write request to indicate if a snoop cycle is required on the processor bus 202.

In the preferred embodiment, before an I2M write request is forwarded to the arbiter (as the signal I2MREQ), the PCI address associated with the I2M write request is forwarded to the processor bus 202 as a snoop cycle to determine if the address is stored in either the L1 cache of the microprocessor 200 or the L2 cache memory 208. If a hit occurs, then the cache line containing the snoop address is invalidated in either the L1 cache or L2 cache memory 208, or both. Once a snoop cycle has been performed for an I2M write, subsequent I2M write requests to addresses on the same cache line need not be snooped. This technique is more fully explained and detailed in U.S. Pat. No. 5,325,503, which is hereby incorporated by reference. The snooped cache line, also referred to as the snoop filter line buffer, is represented as address signals M_SNPA[27:4]. Once a snoop cycle has been executed in response to an I2M write request., a signal SNPVALID is asserted high. The signal SNPVALID is provided by a D flip flop 602, which is clocked by the signal CLK2. If the signal RESET is asserted high, the D flip flop 602 is cleared. The D input of the D flip flop 602 is connected to the output of an AND gate 604, whose first input receives a snoop filter enable signal S_SNPFLTEN, which corresponds to bit 3 of a configuration register. When set high, the signal S_SNPFLTEN enables the snoop filter line buffer; otherwise, if the signal S_SNPFLTEN is set low, then all I2M write requests must be snooped.

The second input of the AND gate 604 is connected to the output of an OR gate 606, whose first input receives a signal I2MSNPREQ, and whose second input is connected to the output of an AND gate 606. The signal I2MSNPREQ is provided by the state machine I2MST for requesting a snoop cycle. The inputs of the AND gate 606 receive the signal SNPVALID, the inverted state of a signal CPUFTRHIT, and the inverted state of a signal M2ISNPREQ. The signal M2ISNPREQ is asserted high to request snoop cycles during M2I read cycles. The signals I2MSNPREQ and M2ISNPREQ are provided to the inputs of an OR gate 612, which provides the signal SNPREQ provided by the MCON 234 to the PCON 230 for requesting a snoop cycle.

When the signal M2ISNPREQ is asserted high, the signal SNPVALID is deasserted low to indicate that the current cache line represented by the signals M_SNPA[27:4] is not valid for an I2M write request. The signal CPUFTRHIT is asserted high if the address presented on the processor address bus PA during a processor-to-memory write cycle or a memory-to-processor read cycle matches the address signals M_SNPA[27:4]. This indicates that data in the snooped cache line may potentially have been modified by the microprocessor 200; as a result, the signal SNPVALID is deasserted low. It is noted that if a 64-bit microprocessor 200 is used, that is, the cache line width is 32 bytes, the processor address bits PA[27:5] are compared to the address signals M_SNPA[27:5]. However, if a 32-bit microprocessor 200 is used, that is, the cache line width is 16 bytes, processor address bits PA[27:4] are compared to address bits M_SNPA[27:4]. The signal Q_I2MNLINE is asserted high if the address associated with the current I2M write request is in a cache line different from the cache line associated with the snooped address M_SNPA[27:4].

The signal P_SNPDONE is provided by a D flip flop 608 located in the PCON 230, which is clocked by the signal CLK2. The D input of the D flip flop 608 is connected to the output of an AND gate 610, whose inputs receive signals D_L1SNP_DONE and D_L2SNP_DONE. The default states of both signals D_L1SNP_DONE and D_L2SNP_DONE are high. If a snoop request is asserted in response to either an M2I read request or an I2M read request, the signals D_L1SNP_DONE and D_L2SNP_DONE are deasserted low. At the same time, the PCON 230 generates a snoop cycle on the processor bus 202 to the microprocessor 200. The PCON 230 also compares the snoop address on the processor address bus PA with the selected entries of the tag RAMS 236 and 238. If the snoop cycle hits a modified line in the L1 cache, the microprocessor 200 asserts its HITM* output to indicate that a writeback cycle will soon follow. The signal D_L1SN_DONE is maintained low. After the modified line has been written back by the microprocessor 200, the signal D_L1SNP_DONE is asserted high. However, if the signal HITM* is not sampled asserted in response to the snoop cycle, the signal D_L1SNP_DONE is asserted high.

The signal D_L2SNP_DONE is asserted high if the snoop cycle misses in the L2 cache memory 208, or if the snoop address hits a shared line in the L2 cache memory 208. In the case of the hit to the shared line, the matching line is invalidated. However, if a hit occurs to a modified line in the L2 cache memory 208, a writeback cycle is performed to the main memory 214, during which time the signal D_L2SNP_DONE is maintained low. After completion of the writeback cycle, the signal D_L2SNP_DONE is asserted high.

Thus, the state machine I2MST transitions from state A to state B if a snoop cycle is needed for the current I2M write request. This condition is true if the signal Q_I2MNLINE is asserted high or the signal SNPVALID is deasserted low. In the transition from state A to state B, the signal I2MSNPREQ is asserted high. However, if the current I2M write request is to a memory address that has already been snooped previously, as indicated by the signal Q_I2MNLINE deasserted low and the signal SNPVALID asserted high, the state machine I2MST transitions from state A to state C. In the transition, the signal I2MREQ, which is provided to the AND gate 338 to control the signal N_I2M, is asserted high.

The state machine I2MST remains in state B until the signal P_SNPDONE is asserted high to indicate completion of the snoop cycle. When that occurs, the state machine I2MST transitions from state B to state C, where control remains until the signal M_I2MDQA is asserted high. In state C, the signal I2MREQ is asserted high. When the signal M_I2MDQA is asserted high to indicate that an I2M write request has been serviced, the state machine I2MST transitions from state C back to state A.

Figure 7:
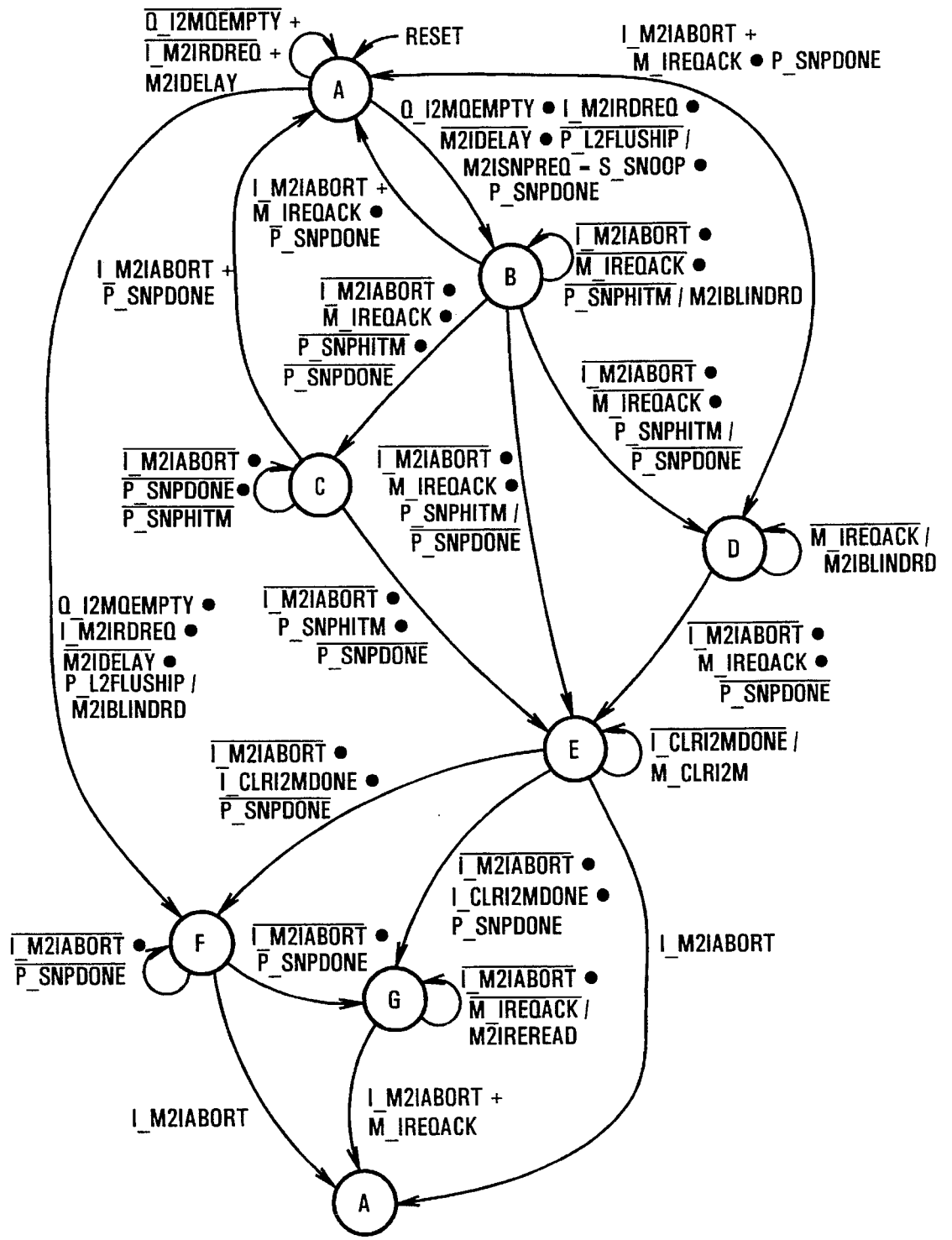
FIGS. 7 and 8 is a logic diagram of circuitry for handling read requests of the memory initiated by a PCI bus master.
Figure 7:
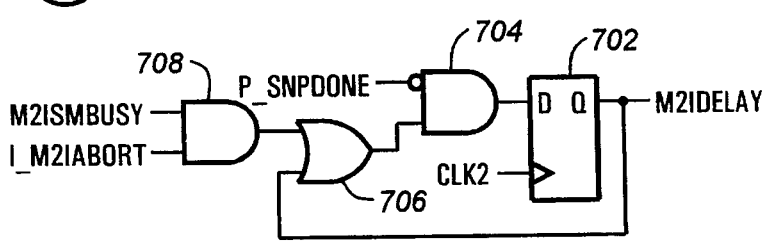
Figure 8:
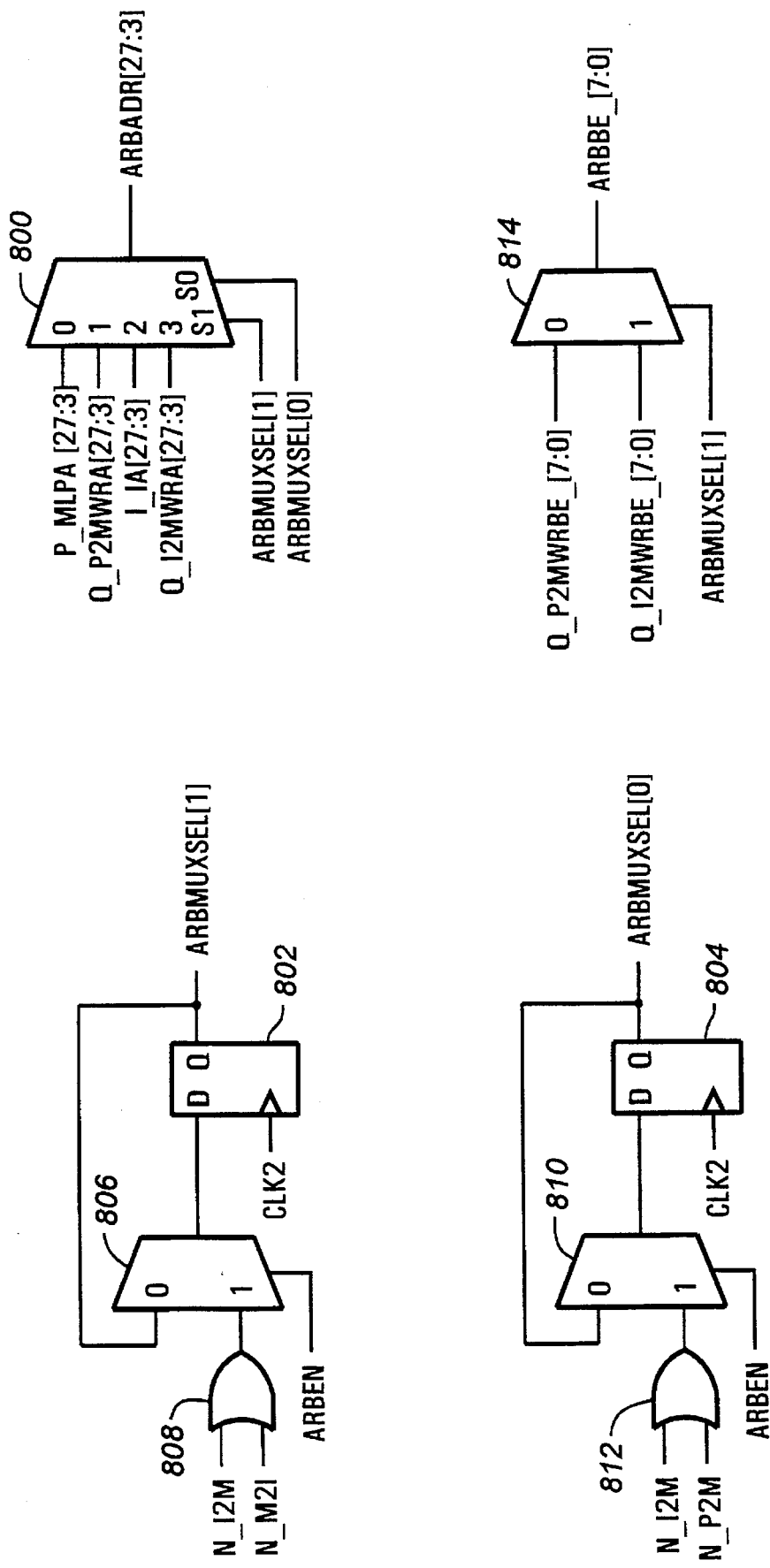

Referring now to FIG. 7, the M2I state machine M2IST and associated logic for controlling M2I read requests are shown. On system reset, the state machine M2IST transitions to state A, where it remains if the signal Q_I2MQEMPTY is deasserted low, or the signal I_M2IRDREQ is deasserted low, or the signal M2IDELAY is asserted high. The signal M2IDELAY is provided by a D flip flop 702, which is clocked by the signal CLK2. The D input of the D flip flop 702 is connected to the output of an AND gate 704, whose first input receives the inverted state of the signal P SNPDONE, and whose second input is connected to the output of an OR gate 706. The first input of the OR gate 706 receives the signal M2IDELAY, and the second input is connected to the output of an AND gate 708. The inputs of the AND gate 708 receive signals M2ISMBUSY and I_M2IABORT. The signal M2ISMBUSY is asserted high if the state machine M2IST is not in idle state A. The signal I_M2IABORT is asserted high to abort an M2I read request. Thus, if the state machine M2IST is busy, or an M2I abort command has been received, and a snoop cycle is in progress on the processor bus 202 as indicated by the signal P_SNPDONE deasserted low, the D flip flop 702 drives the signal M2IDELAY high on the rising edge of the signal CLK2. Once asserted high, the signal M2IDELAY remains asserted until the signal P_SNPDONE is asserted high to indicate the completion of the snoop cycle. Thus, the signal M2IDELAY holds off subsequent M2I read requests if the signal I_M2IABORT is sampled active while the state machine M2IST is busy and a snoop cycle requested by the aborted M2I read request is still in progress.

If the expression (Q_I2MQEMPTY•I_M2IRDREQ•!M2IDELAY•!P_L2FLUSHIP) is true, then the state machine M2IST transitions from state A to state B. The signal P_L2FLUSHIP is asserted high by the PCON 230 to indicate that the L2 cache memory 208 is currently being flushed. Thus, if the I2M queue is empty, an M2I read request is asserted, and the signals M2IDELAY and P_L2FLUSHIP are deasserted low, then control transitions from state A to state B. The signal M2ISNPREQ is asserted high in the transition if the signals P_SNPDONE and S_SNOOP are asserted high. The signal S_SNOOP indicates that the PCI address associated with the asserted M2I read cycle is a cacheable address, that the L1 or L2 cache is enabled, and that the L1 or L2 cache is configured in writeback mode. Assertion of the signal M2ISNPREQ causes a snoop cycle to be generated by the PCON 230 on the processor bus 202. In state B, if the abort signal I_M2IABORT is asserted high, the state machine M2IST returns from state B to state A. Control also returns to state A if the signals M_IREQACK and P_SNPDONE are asserted high to indicate that the M2I read request has been granted by the arbiter and the snoop cycle requested by the M2I read request has been completed.

In the following discussion, the abort signal I_M2IABORT is assumed to be deasserted low unless indicated otherwise. From state B, the state machine M2IST transitions to state C if the signal M_IREQACK is asserted high and the signals P_SNPHITM and P_SNPDONE are deasserted low. This indicates that the M2I read request has been granted, but the requested snoop cycle has not yet completed. While the signals P_SNPDONE and P_SNPHITM remain low, the state machine M2IST remains in state C. However, if the signal P_SNPDONE is asserted high to indicate the completion of the snoop cycle without a hit to a modified line in either the L1 or L2 cache, the state machine M2IST returns to state A. In addition, control returns to state A if the abort signal I_M2IABORT is asserted high. In state C, if the signal P_SNPHITM is asserted high and the signal P_SNPDONE is deasserted low, the state machine transitions from state C to state E. This indicates that a hit has occurred to a modified line in either the L1 or L2 cache and a writeback cycle will be performed.

The state machine M2IST transitions directly from state B to state E if the signals M_IREQACK and P_SNPHITM are asserted high and the signal P_SNPDONE is deasserted low. This indicates that the M2I read request has been granted, but the M2I read address has hit a modified line in either the L1 or L2 cache.

In state B, if the signals M_IREQACK and P_SNPDONE are deasserted low, and the signal P_SNPHITM is asserted high, then control proceeds from state B to state D. This indicates that the M2I read request has not been granted by the arbiter and the snoop address has hit a modified line in either the L1 or L2 cache. In state D, if the signals M_IREQACK and P_SNPDONE are asserted high, the state machine M2IST returns to state A. The state machine also returns to state A if the signal I_M2IABORT is asserted high. The state machine M2IST transitions from state D to state E if the signal M_IREQACK is asserted high but the signal P_SNPDONE is deasserted low, indicating that the M2I read request has been granted, but the L2 writeback cycle has not yet completed.

The state machine M2IST remains in state E while a signal I_CLRI2MDONE is deasserted low. In state E, a signal M_CLRI2M is asserted high to clear the I2M queue in the data buffers 212 and 213. Since the M2I read and snoop request are executed concurrently, the M2I read data may already be in the bi-directional I2M queue of the data buffers 212 and 213. Consequently, the I2M queue must be reset to ensure that the data obtained from a subsequent M2IREREAD request (described below) is the data transmitted to the PCI bus 98. When the clearing of the I2M queue is completed, the signal I_CLRI2MDONE is asserted high by the ICON 232.

If the abort signal I_M2IABORT is asserted high, the state machine transitions from state E back to state A. But if the signal I_M2IABORT is deasserted low, and the signals I_CLRI2MDONE and P_SNPDONE are asserted high, the state machine M2IST transitions from state E to state G. The transition indicates that the I2M queue has been cleared and the writeback of the modified cache line has completed. However, if the signal I_CLRI2MDONE is asserted high, but the signal P_SNPDONE is deasserted low to indicate that the writeback cycle has not completed, the state machine M2IST transitions from state E to state F. In state F, if the abort signal I_M2IABORT is asserted, the state machine returns to state A. But if the signal I_M2IABORT is deasserted low, and a signal P_SNPDONE is asserted high, the state machine M2IST transitions from state F to state G. In state G, the state machine M2IST asserts the signal M2IREREAD high to regenerate the M2I read request that hit a modified line in either the L1 or L2 cache. The state machine remains in state G until the arbiter responds to the assertion of the signal M2IREREAD by driving the signal M_IREQACK high. When that occurs, the state machine transitions from state G back to state A. In addition, the state machine also returns to state A if the abort signal I_M2IABORT is asserted high.

In state A, if the L2 cache memory 208 is flushed, as indicated by asserting the signal P_L2FLUSHIP high, and if the signals Q_I2MQEMPTY, I_M2IRDREQ, and M2IDELAY are driven high, high and low, respectively, the state machine M2IST transitions to state F. When the L2 cache memory 208 is flushed, all its modified lines are written back to the main memory 214. Thus, if a L2 cache flush cycle is in progress, the pending M2I read request is treated as if its address has hit a modified line in the L2 cache memory 208. After the flush operation has completed, and all of the modified lines have been written back from the L2 cache memory 208 to the main memory 214, the signal P_SNPDONE is asserted high to cause the state machine M2IST to transition from state F to state G. In state G, the signal M2IREREAD is asserted high as an M2I read request.

The signal M2IBLINDRD is asserted high when the state machine M2IST is in state B or in state D. Also, the signal M2IBLINDRD is asserted high if the state machine M2IST is in state A and the signal P_L2FLUSHIP is asserted high. Thus, when asserted high, the signal M2IBLINDRD indicates that the status of the requested snoop cycle is unknown.

Thus, an arbitration system has been described for controlling access to the main memory for requests asserted by the microprocessor, the refresh controller and PCI bus masters. Generally, the priority of the memory requests are as follows, with some exceptions: (1) second refresh request; (2) processor-to-memory write request; (3) memory-to-processor read request; (4) PCI-to-memory write request; (5) memory-to-PCI read request; and (6) first refresh request. The second refresh request indicates that two refreshes are outstanding. When that occurs, both outstanding refresh requests are assigned the highest priority. The processor-to-memory write request is always higher in priority than other memory requests except the second refresh. However, under certain conditions, the processor-to-memory write requests is held off to allow other cycles to proceed. The memory-to-processor read request is generally higher in priority than the PCI write and read requests, unless certain conditions occur to override that priority. PCI-to-memory write requests are always higher in priority than memory-to-PCI read requests.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A circuit for arbitrating access to a memory in a computer system, the computer system including a first bus, a second bus, a microprocessor coupled to the first bus, and a peripheral device coupled to the second bus, wherein the microprocessor is capable of generating write and read requests to the memory, each of the microprocessor write and read requests being provided with a first bus address, and wherein the peripheral device is capable of generating write and read requests to the memory, each of the peripheral device write and read requests being provided with a second bus address, the circuit comprising:

first receiving means coupled to the first bus for receiving microprocessor generated write and read requests;

second receiving means coupled to the second bus for receiving peripheral device generated write and read requests;

means for asserting an arbitration signal to indicate that an arbitration cycle is enabled;

means responsive to said arbitration signal and coupled to said first and second receiving means for assigning priority to said received microprocessor write and read requests and said received peripheral device write and read requests if said arbitration signal is asserted, wherein a received microprocessor write request is assigned a higher priority than a received microprocessor read request or a peripheral device write or read request, and wherein a received microprocessor read request is assigned a lower priority than a received microprocessor write request but a higher priority than a received peripheral device write request, except that a received microprocessor read request is forced lower in priority than a received peripheral device write request if:

(a) the first bus address provided with said received microprocessor read request is the same as the second bus address provided with said received peripheral device write request; or (b) a peripheral device read request is received while said received peripheral device write request is pending; and means coupled to the memory and to said priority assigning means for granting access to the memory to the highest priority request.

2. The circuit of claim 1, wherein a received microprocessor read request is assigned a higher priority than a received peripheral device read request, except that a received microprocessor read request is forced lower in priority than a received peripheral device read request if (c) said received peripheral device read request is received while a peripheral device write request is pending.

3. The circuit of claim 2, wherein a currently received microprocessor read request is forced lower in priority than a received peripheral device read request if (d) said received peripheral device read request was received in a previous arbitration cycle along with a microprocessor read request and said previously received microprocessor read request was assigned the highest priority in said previous arbitration cycle.

4. The circuit of claim 3, wherein the microprocessor is capable of generating a pseudo locked read request, and wherein even if condition (c) or (d) is true, said received pseudo locked microprocessor read request is assigned a higher priority than said received peripheral read request.

5. The circuit of claim 1, wherein the microprocessor is capable of generating a locked read request, the circuit further comprising:

means coupled to the first bus for detecting said microprocessor locked read request; and means coupled to said detecting means and to said first receiving means for asserting a lock signal if said microprocessor locked read request is detected and a peripheral device write request is not received, wherein if said lock signal is asserted, a received microprocessor locked read request is assigned a higher priority than a received peripheral write request.

6. The circuit of claim 5, wherein if said lock signal is not asserted, said received microprocessor locked read request is forced lower in priority than a received peripheral device write request.

7. The circuit of claim 1, wherein the computer system further includes a refresh controller coupled to the memory for generating a first refresh request to refresh the memory at predetermined time intervals, wherein a received first refresh request is assigned a lower priority than a received microprocessor write or read request or a received peripheral device write or read request.

8. The circuit of claim 7, wherein said refresh controller generates a second refresh request after said predetermined time interval has expired and said first refresh request has not been granted access to the memory, and wherein said second refresh request is assigned a higher priority than a received microprocessor write or read request or a received peripheral device write or read request.

9. The circuit of claim 8, wherein if a second refresh request is received, said received first refresh request is also assigned a higher priority than a microprocessor write or read request or a received peripheral write or read request.

10. The circuit of claim 1, further comprising:

a first queue coupled to said first receiving means and having a plurality of entries for storing received microprocessor write requests, wherein said priority assigning means assigns priority to received microprocessor write requests only if stored in said first queue;

a second queue coupled to said second receiving means and having a plurality of entries for storing received peripheral device write requests, wherein said priority assigning means assigns priority to received peripheral device write requests only if stored in said second queue; and means coupled to said first and second receiving means and to said first and second queues for providing a first nopost signal, wherein said first nopost signal is asserted if said second queue is full, and wherein assertion of said first nopost signal prevents subsequently received microprocessor write requests from entering said first queue.

11. The circuit of claim 10, wherein said first nopost signal is also asserted if said first queue is not empty, said second queue is not empty, and a peripheral device read request is received.

12. The circuit of claim 10, further comprising:

means responsive to said arbitration signal and coupled to said first and second receiving means for providing a second nopost signal, wherein said second nopost signal is asserted if said arbitration signal is asserted, a microprocessor read request is received, and in a previous arbitration cycle, a microprocessor read request was forced lower in priority than a peripheral device write request because the first bus address provided with said received microprocessor read request is the same as the second bus address provided with said received peripheral device write request, and wherein asserting said second nopost signal prevents subsequently received peripheral device read requests from entering said second queue.

13. A method of arbitrating access to a memory in a computer system, the computer system including a first bus, a second bus, a microprocessor coupled to the first bus, and a peripheral device coupled to the second bus, wherein the microprocessor is capable of generating write and read requests to the memory, each of the microprocessor write and read requests being provided with a first bus address, and wherein the peripheral device is capable of generating write and read requests to the memory, each of the peripheral device write and read requests being provided with a second bus address, the method comprising the steps of:

receiving microprocessor generated write and read requests;

receiving peripheral device generated write and read requests;

asserting an arbitration signal to indicate that an arbitration cycle is enabled;

assigning priority to said received microprocessor write and read requests and said received peripheral device write and read requests if said arbitration signal is asserted, wherein a received microprocessor write request is assigned a higher priority than a received microprocessor read request or a peripheral device write or read request, and wherein a received microprocessor read request is assigned a lower priority than a received microprocessor write request but a higher priority than a received peripheral device write request, except that a received microprocessor read request is forced lower in priority than a received peripheral device write request if:

(a) the first bus address provided with said received microprocessor read request is the same as the second bus address provided with said received peripheral device write request; or (b) a peripheral device read request is received while said received peripheral device write request is pending; and granting access to the memory to the highest priority request.

14. The method of claim 13, wherein a received microprocessor read request is assigned a higher priority than a received peripheral device read request, except that a received microprocessor read request is forced lower in priority than a received peripheral device read request if (c) said received peripheral device read request is received while a peripheral device write request is pending.

15. The method of claim 14, wherein a currently received microprocessor read request is forced lower in priority than a received peripheral device read request if (d) said received peripheral device read request was received in a previous arbitration cycle along with a microprocessor read request and said previously received microprocessor read request was assigned the highest priority in said previous arbitration cycle.

16. The method of claim 15, wherein the microprocessor is capable of generating a pseudo locked read request, and wherein a received pseudo locked microprocessor read request is assigned a higher priority than said received peripheral write request even if condition (c) or (d) is true.

17. The method of claim 13, wherein the microprocessor is capable of generating a locked read request, the method further comprising the steps of:

detecting for said microprocessor locked read request; and asserting a lock signal if said microprocessor locked read request is detected and a peripheral device write request is not received, wherein if said lock signal is asserted, a received microprocessor locked read request is assigned a higher priority than a received peripheral read request.

18. The method of claim 17, wherein if said lock signal is not asserted, said received microprocessor locked read request is forced lower in priority than a received peripheral device write request.

19. The method of claim 13, wherein the computer system further includes a refresh controller coupled to the memory for generating a first refresh request to refresh the memory at predetermined time intervals, wherein a received first refresh request is assigned a lower priority than a received microprocessor write or read request or a received peripheral device write or read request.

20. The method of claim 19, wherein said refresh controller generates a second refresh request after said predetermined time interval has expired and said first refresh request has not been granted access to the memory, and wherein said second refresh request is assigned a higher priority than a received microprocessor write or read request or a received peripheral device write or read request.

21. The method of claim 20, wherein if a second refresh request is received, said received first refresh request is also assigned a higher priority than a microprocessor write or read request or a received peripheral write or read request.

22. The method of claim 13, wherein the computer system further includes a first queue having a plurality of entries for storing received microprocessor write requests and a second queue having a plurality of entries for storing received peripheral device write requests, wherein priority is assigned to received microprocessor write requests only if stored in said first queue, wherein priority is assigned to received peripheral device write requests only if stored in said second queue, the method further comprising the step of:

asserting a first nopost signal if said second queue is full, wherein asserting said first nopost signal prevents subsequently received microprocessor write requests from entering said first queue.

23. The method of claim 22, wherein said first nopost signal is also asserted if said first queue is not empty, said second queue is not empty, and a peripheral device read request is received.

24. The method of claim 22, further comprising the step of:

asserting a second nopost signal if said arbitration signal is asserted, a microprocessor read request is received, and in a previous arbitration cycle, a microprocessor read request was forced lower in priority than a peripheral device write request because the first bus address provided with said received microprocessor read request is the same as the second bus address provided with said received peripheral device write request, and wherein asserting said second nopost signal prevents subsequently received peripheral device read requests from entering said second queue.

* * * * *